3,079,448
ALKYLATING CATALYSTS AND ALKYLATION
PROCESS BASED THEREON
Robert Jenny, Colombes, France, assignor to Institut
Francais du Petrole des Carburants et Lubrifiants,
Paris, France
Filed May 1, 1959, Ser. No. 810,469
Claims priority, application France May 7, 1958
14 Claims. (Cl. 260—671)

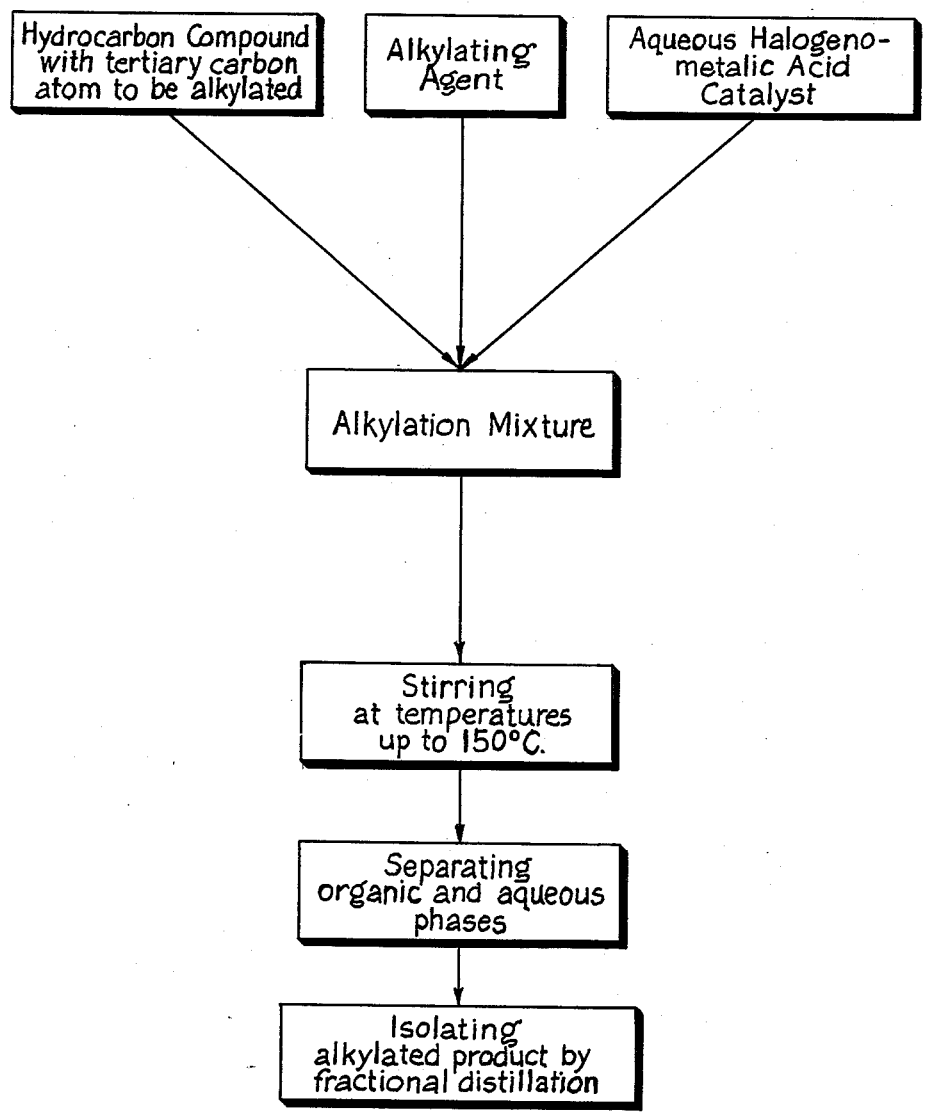

This invention relates to alkylation processes with the aid of a new class of alkylating catalysts.

It is an object of my invention to provide a new class of catalysts which are particularly effective for alkylating catalyses of hydrocarbon compounds containing at least one tertiary carbon atom and including aromatic hydrocarbon compounds, which catalysts can be obtained in a less expensive manner than the presently known Friedel-Crafts type catalysts and can be more easily separated and recuperated from the reaction products.

It is well known in organic chemistry to use a group of catalysts designated as Friedel-Crafts catalysts, in a group of processes referred to as Friedel-Crafts catalyses. Thus, certain alkylation reactions have already been carried out with certain anhydrous metal chlorides and metal bromides.

It is universally believed that these catalysts must be used in the anhydrous state, and the presence of water has hitherto been carefully avoided in processes using these Friedel-Crafts catalysts (C. A., Thomas, "Anhydrous Aluminum Chloride in Organic Chemistry," Reinhold Publishing Corporation, 1941, page 867). Only traces of water were eventually permissible, while it was believed that the presence of water in appreciable amounts would lead to a weakening of the catalytic effect of the Friedel-Crafts catalysts used, by decomposing a smaller or larger share of the same.

Among the known catalysts of this group of anhydrous metal chlorides, bromides and iodides, there are anhydrous zinc, tin and aluminum chlorides, bromides and iodides, and also anhydrous ferric chloride. However, it is well known that certain reactions of considerable commercial interest cannot be carried out with one or the other of the above catalysts. Thus the catalytic alkylation of benzene with ethylene or higher alpha-olefins is not possible with anhydrous ferric chloride (W. Gallay and G. S. Whitby, "Can. J. Research" 2, 31–34 (1930), C. A. 24, p. 2123), although this catalysis would be of considerable importance in the petroleum industry. Indeed, the alkylation of aromatic hydrocarbons is considered in the art to be most difficult to realize (G. Stadnikoff and A. Baryschewa, Ber. 61 (1928), pp. 1996–1999).

The aqueous solutions of chlorides and bromides of the heavier metals, such as zinc, titanium, tin, antimony, bismuth, and iron were not believed to be useful in alkylation processes generally due to their much weaker catalytic action which is unsatisfactory in alkylation catalyses, as compared with the anhydrous Friedel-Crafts catalysts proper, i.e. the chlorides, bromides and iodides of zinc, iron, tin and aluminum. In all known alkylation processes with Friedel-Crafts catalysts, the alkylating reaction takes place in either the organic compound being alkylated itself, or in a solution of the latter compound and the alkylating agent in a suitable organic solvent which must be inert against the metal halide catalyst.

As another catalyst, but outside the known class of chlorides, bromides and iodides of divalent and higher valent metals, there shall be mentioned, for the sake of completeness, the fluoride of an amphoterous element, the first one in group III of the Periodic Table of Mendelyeev, namely boron, whose fluoride has been used in aqueous solutions in a number of alkylating reactions without, however, gaining industrial importance due to the relatively high cost of boron and fluorine as reactants required for the production of the catalyst and the great difficulties encountered in trying to separate these compounds for re-using them, as well as due to the excessive amounts of these reactants required.

Contrary to what was to be expected from all known publications and from the general behavior of the known Friedel-Crafts type catalysts and related catalytically more or less active inorganic metal halides, I have discovered that excellent alkylation catalysts, permitting to successfully obtain the object stated hereinbefore, are constituted by aqueous solutions of certain chloro-and bromo-metallic acids which are capable of forming relatively concentrated, stable aqueous solutions. Such acids are those complex compounds obtained from the chlorides and bromides of certain metals in groups II, IV, V, and VIII of the Periodic Table of Mendelyeev, all of which metals can be characterized as heavier than aluminium. These metals are specifically zinc in group IIB, titanium, and tin in group IV, antimony in its metallic allotropic modification, and bismuth in group VB, and iron in group VIII of the aforesaid Periodic Table.

The absence of all metals of a weight equal to and lighter than aluminium is believed to be significant. This excludes alumino-chloric acid, of which cryolite may be considered the sodium salt, and thus practically all metals of group III. Although it is possible that the heavier metals in this group might be operative as metals in the formation of catalysts according to my invention, these metals and their compounds are too rarely available and too expensive to be considered as useful for alkylation catalyses on an industrial scale. Moreover, chloroaluminic and bromoaluminic acids are too unstable for use in these catalyses.

The following acids can be used, for instance, either by dissolving the crystallized solid or liquid acid in neutral water or in aqueous solutions of either the hydrohalic acid of the same halogen being contained in the halogenometallic acid, or the corresponding metal halide.

| Acid formula: | Melting point (° C.) |
|---|---|
| $H(FeCl_4).2H_2O$ | 45.7. |
| $H(FeCl_4).4H_2O$ | −3. |
| $H(FeCl_4).6H_2O$ | −6. |
| $H(Sb_2Cl_7).2H_2O$ | 16. |
| $H(SbCl_6).2H_2O$ | Solid at room temperature. |
| $H(Bi_2Cl_7).3H_2O$ | Solid at room temperature. |
| $H(SnCl_3).3H_2O$ | −27. |
| $H_2(SnCl_6).6H_2O$ | 20. |
| $H(ZnCl_3).2H_2O$ | Solid at room temperature. |
| $H(Zn_2Cl_5).2H_2O$ | Solid at room temperature. |

These acids can generally be dissolved in water, without decomposition, in varying concentrations up to concentrations of one mole of the acid per six moles of water.

The aqueous solutions of chloro- and bromo-metallic acids constituting the catalysts according to my invention can also be obtained in a simple manner by bringing together in water the components from which they are formed, i.e. the metal halide and the corresponding hydrohalic acid. In so doing, it is not indispensable to use exactly stoichiometrical amounts of the reactants. On the contrary, I have found that it is often advantageous to use an excess of one or the other of the reactants. For in the presence of an excess, for instance, of hydrochloric acid, the stability of the aqueous solution of the chlorometallic acids is generally enhanced, while the use of an excess of metal halide generally strengthens the catalytic activity of the aqueous solutions.

The aforesaid aqueous solutions which can be used in concentrations of one gram atom of the metal in, for instance, about 20 up to maximal concentrations of one gram atom of metal in less than six and, for instance, only one mole of water, are characterized by their great catalytic activity in alkylation reactions. By the term "alkylation" I understand all reactions leading to the substitution of an alkyl radical for another radical, for instance a hydrogen atom, bonded to a tertiary carbon atom. Tertiary carbon atoms are, of course, those, three bonds of which are occupied by other carbon atoms. The tertiary carbon atom which is to be alkylated can thus be an atom in an aliphatic chain or an aromatic ring molecule, while the alkyl radical to be introduced can be derived from an alcohol, an olefine, an ester or a halogenated alkyl compound, of which at least one halogen atom is bonded to an aliphatic carbon atom.

Thus, the catalytically active aqueous solutions according to the invention may, for example, be used for introducing, bonded to a tertiary carbon atom in one of the above-described organic compounds, an alkyl group being for instance the ethyl, propyl, isopropyl, butyl, amyl, benzyl, cyclohexyl, dodecyl or octadecyl radical, while the organic compound may, for instance, be benzene, phenol, naphthalene or another aromatic as well as a saturated or unsaturated aliphatic compound, always under the condition that it possesses at least one tertiary carbon atom per molecule.

It is, indeed, most surprising that the presence of water in the generally preponderant amounts necessary to dissolve the chloro- or bromo-metallic acids leads to the formation of chemical systems which are entirely distinct in the efficacy of their catalytic properties from those of the anhydrous metal chlorides and bromides from which these halogeno-metallic acid solutions may be obtained. In fact, these aqueous solutions constitute undoubtedly a most interesting new class of catalysts. This is shown by the fact that these new catalysts permit to achieve with satisfactory yields a number of alkylations which cannot be realized with the corresponding anhydrous metal chloride or bromide. Thus, I have succeeded in alkylating benzene with ethylene as the alkylating agent by using an aqueous solution of chloroferric acid as the alkylation catalyst.

Furthermore, as another example of the superior catalytic properties of the aqueous catalytic solutions according to my invention over the anhydrous metal halides, anhydrous stannous chloride possesses only very unsatisfactory catalytic properties in alkylation reactions, while aqueous solutions of chlorostannous acids according to the present invention permit to carry out even difficult alkylations. Anhydrous antimony trichloride does not catalyze the alkylation of the aromatic nucleus of phenols in a satisfactory manner, whereas chloroantimonious acid according to the invention in aqueous solutions is an excellent alkylation catalyst. Hitherto, anhydrous antimony pentachloride and bismuth trichloride were apparently never used as a catalyst for alkylation reactions. The corresponding chlorometallic acids in aqueous solution are very satisfactory alkylation catalysts.

On the other hand, aluminum trichloride in aqueous hydrochloric acid solution does not active alkylation reactions.

No scientific explanation can be given at the present time as to why aqueous solutions of halogeno-metallic acids show this hitherto unknown superior catalytic activity. I have, however, been able to determine by experiment the conditions under which these solutions must be utilized to achieve optimal catalytic results.

These conditions, namely temperature and pH of the solution, must be such that the concentration of the halogenometallic acid in its aqueous solution is between, on the one hand, the maximum concentration if any at which the solution is saturated in the acid, and, on the other hand, the minimum concentration below which hydrolysis of the acid if any would occur and lead to its decomposition and formation of a precipitate of the metal halide and/or metal oxide hydrate in the solution. These two limits may be, for instance, between 1:1 and 1:20 expressing the ratio of gram atoms of the metal of the halogenometallic acid to moles of water, as has been mentioned above. These ratios vary according to the type of individual acid and the temperature and pH applied, and have to be determined empirically to find optimal values for each alkylation reaction. Such empirical determination is, however, well within the reach of a chemist, once the method to be followed in preparing and applying these new catalysts has been understood.

I prefer to use catalytic solutions having a concentration of halogenometallic acid closer to the aforesaid maximum than to the aforesaid minimum concentration, because the reaction velocity of the alkylation reaction decreases with increasing dilution of the catalyst.

The different above-mentioned halogenometallic acids are not equivalent in their catalytic properties and differ with regard to their individual catalytical activities. Thus, the chlorometallic acids are generally more active than the bromometallic acids, easier to handle and less costly to prepare.

Alkylations according to my invention can be carried out as illustrated in the accompanying flow sheet by—

(a) Mixing together under good stirring a hydrocarbon compound having at least one tertiary carbon atom, an alkylating agent selected from the group consisting of olefins, alkylhalides, alcohols and esters, and an aqueous solution of a halogenometallic acid, the metal of which is heavier than aluminum, in such an order that the hydrocarbon compound is always present when the alkylating agent is admixed, (b) Separating the organic and aqueous phases from each other (in a conventional manner), and (c) Fractionating the organic phase in a conventional manner to obtain the alkylated product therefrom.

Compared with the known Friedel-Crafts catalysts, the catalysts according to my invention offer numerous advantages among which there are—

(1) The commercially available aqueous solutions of metal bromides and chlorides and of the respective hydrohalic acids can be used directly by bringing the mixtures to the desired concentration, either by evaporation of part of the solvent, or by adding water or the hydrohalic acid.

These commercial solutions are obtained mostly much more easily than the anhydrous metal chloride or bromide. Their preparation can be effected generally by reaction of diluted hydrochloric or hydrobromic acid in the liquid phase and/or dissolved chlorine, or bromine, on the metal or a salt or oxide of the metal.

The difficulties that would be encountered in many cases if the anhydrous metal chloride were to be prepared from the above reaction mixture are advantageously avoided. Although, in some cases, the aqueous solutions could be used for producing the anhydrous chloride or bromide therefrom, yet this would constitute an additional, superfluous step. In other cases, as in that of ferric chloride, it is impossible to produce the anhydrous salt from the solution, as is well known. Since it is decomposed during the dehydration treatment, and the anhydrous salt would have to be produced industrially from the elements or by chlorination of the iron oxide or phosphate at very high temperatures of about 1000° C.

(2) The catalytically active aqueous halogenometallic acid solutions according to my invention can be prepared in situ by dissolving in an aqueous solution of hydrochloric or hydrobromic acid, containing eventually elementary chlorine or bromine dissolved therein, the respective metal heavier than aluminum, or an oxide or salt thereof, such as, for instance, iron carbonate, iron phosphate, zinc oxide or zinc sulfide. It is, of course, always possible to produce the catalyst in situ by dissolving directly in water the halogenometallic acid itself, or by dissolving the metal halide, its hydrates or chlorohydrates, in an aqueous solution of the hydrohalic acid.

(3) The catalyst can be separated at the end of the reaction by simple decantation of the reaction medium. Indeed, the organic phase in which the desired reaction product is to be found, is the supernatant fluid, while the catalytic aqueous solution is deposited as the lower phase layer by simple gravitation. This separation technique has been employed in the known catalytic processes of heterogeneous phase, but by using an organic solvent for the anhydrous catalyst, which solvent is immiscible with the reactants and the reaction products. The process according to my invention is simpler and less costly in that it permits to use water for the removal of the catalyst rather than an organic solvent.

(4) The aqueous solutions of the halogenometallic acids, for instance of chloroferric and bromoferric, of chlorozinc and bromozinc acids, have a pronounced catalytic activity in alkylation processes, while the respective anhydrous chlorides and bromides, for instance of iron and zinc, show only insufficient catalytic activities, so that they are not considered as good industrial alkylation catalysts. The superiority of the catalysts according to my invention is such that they can effectively compete with anhydrous aluminum chloride which has been hitherto the only alkylation catalyst used successfully on an industrial scale.

(5) The catalytic activity of the catalysts according to my invention can be adapted to the specific requirements of each particular alkylation process. It is indeed possible by the selection of a suitable concentration of the halogenometallic acid in the aqueous phase, or simpler still, by selecting the concentration of the metal halide and of the hydrohalic acid in the aqueous phase, to obtain catalytic solutions adapted to each type of alkylation reactions, for example concentrated aqueous solutions, containing preferably less than six molecules of water per atom of metal, will be required only for the alkylation of hydrocarbons of low activity such as benzene, while the alkylation of more highly reactive aromatic compounds such as the phenols can be carried out, under the conditions of my invention, by using more diluted solutions containing, for instance, up to 20 molecules of water per atom of metal.

It is thus possible to choose for each alkylation reaction the concentration which corresponds to the desired alkylation velocity, an increase in the concentration resulting naturally in a higher reaction velocity. However, the concentration of the aqueous catalyst must, of course, remain within the limits stated hereinbefore.

It is also possible to adjust the catalytic activity of an aqueous halogenometallic acid solution by adding hydrochloric or hydrobromic acid thereto. These latter adjuvants act either directly by partaking in the catalytic reaction mechanism, or indirectly by modifying the solubility of the halogenometallic acid; for example, the limit concentration at saturation of chloroferric acid is greater in a solution acidified with hydrochloric acid than in pure water. When using, on the other hand, an aqueous solution of chlorozinc acid, there is no need for adding hydrochloric acid, since this would decrease the solubility of chlorozinc acid.

In each particular case, when the halogenometallic acid is formed in situ, it is thus recommended to choose the ratio of metal halide, hydrohalic acid and water in such a manner that optimal yields are obtained in the catalytic process. This can be determined in the quickest and simplest manner empirically by a small pilot test.

It should be borne in mind that, as I have found, the alkylation reaction takes place in the aqueous phase, not in the organic phase. The amount of material alkylated per unit of time depends, therefore, on the volume of the aqueous phase present.

The alkylation employing a catalyst according to my invention can be carried out easily in a continuous process due to the simple manner in which the catalyst can be separated from the end products of the catalysis, for instance, by such separation methods as decantation or centrifugation.

A continuous process can be realized by different modes of operation, such as for instance—

*First mode.*—The reaction mixture consists of a dispersion of the organic phase containing the desired alkylated end products, in the aqueous phase. Part of this reaction mixture is withdrawn continuously from the reaction zone proper to the degree that new material is fed into that zone and the withdrawn mixture is decanted or centrifuged and thus separated into the organic and the aqueous phase; the organic phase is washed with water or a mineral hydroxide to remove therefrom all traces of acid or catalyst, and is then subjected to a known fractionation treatment such as fractionated distillation in order to isolate the desired alkylated product; the aqueous phase and the remainder of the organic phase fractions are recycled into the reaction zone.

*Second mode.*—The alkylation is carried out in a preferably vertically disposed tubular reactor, which contains the aqueous catalyst phase, and into the lower part of which reactor the reactants are fed continuously. The central region of the reactor is strongly agitated, so as to maintain a satisfactory reaction velocity in the aqueous phase. The rate of feeding the reactants is adapted to the rate at which an organic phase gathers as a liquid or vapor phase in the upper part of the reactor due to differences in density, and can be withdrawn continuously from the reactor. The desired alkylated product is then isolated from this organic phase as described above, and the remainder of the organic phase is recycled into the reactor.

These modes of operation have been described only by way of examples and can, of course, be varied in many ways.

Thus, in some cases, it is advantageous to dissolve the organic reactants in an inert solvent. This is, for instance, so in the alkylation of naphthalene, anthracene, cresols or other solid compounds. It is also advantageous to do so when the compound to be alkylated or the mixture thereof with the alkylating agent is too viscous, or its volatility too high at the operating temperature.

Inert solvents suitable for this purpose are chlorinated organic solvents such as carbon tetrachloride, unbranched aliphatic hydrocarbons, cycloaliphatic hydrocarbons such as cyclohexane, and the like conventional solvents.

The alkylating catalysts according to my invention are particularly active in carrying out the alkylation of aromatic hydrocarbons considered, in the past, to be especially difficult to alkylate. In particular, mono- and polyaromatic hydrocarbons with or without hydrocarbon substituents or polar substituents such as, for instance, halogen atoms, hydroxyl groups, alkoxy radicals have been alkylated successfully without difficulties. Substitutions have been carried out in these aromatic hydrocarbons by introducing aliphatic or arylaliphatic primary, secondary and tertiary alkyl radicals.

As has been mentioned further above, the concentration of the halogenometallic acid in the catalytic aqueous solutions according to my invention is chosen as a function of the reactivity of the hydrocarbon compound to be alkylated as well as of the reactivity of the alkylating agent. If a very strong catalytic activity is required to bring about the desired alkylating reaction, it is advantageous to operate at elevated temperatures so as to raise the solubility coefficient of the halogenometallic acid in water and thus to obtain a more concentrated catalytic solution. Since, however, the reaction temperature should be held always below the boiling temperature of the catalytic solution, it is then often advisable to operate under excess pressure. In the case of using a gaseous reactant, the use of excess pressure above atmospheric pressure may also permit to increase the concentration of that reactant in the catalytic solution so as to ensure a higher alkylation velocity. Excess pressure also permits, if desired, to maintain in the liquid state a reactant to be alkylated, or being itself an alkylating agent, which reactant would otherwise be in the gaseous phase under atmospheric pressure and at the reaction temperature to be employed.

It will be noted that the hydrocarbon compound to be alkylated is preferably present in stoichiometrical excess over the amount of alkylatnig agent used when the reaction has to be limited to a monoalkylation.

As will be seen from the examples given below, the halogenometallic acid may also be formed from a metal chloride and hydrobromic acid forming an acid with mixed halogen content, or invertedly from a metal bromide and hydrochloric acid. In this manner, the following acids can be obtained—

$$HBr + ZnCl_2 \rightarrow H[ZnCl_2Br]$$
$$HCl + ZnBr_2 \rightarrow H[ZnBr_2Cl]$$

In certain cases, these two acids are almost as active catalytically as $HZnCl_3$ and much more active than $HZnBr_3$; in others, they as well as $HZnCl_3$ and $HZnBr_3$ selectively steer the catalysis toward the preponderance of certain final products over others in a mixed end product.

The invention will be further illustrated in detail by a number of examples which should, of course, not be considered as limitative of the scope of the same. The yield rates given in these examples are in percentages of the theoretical yield that would be obtained by the complete consumption of the amount of alkylating agent introduced into the reaction. These yield rates do not take into account the amounts of reactants being recovered and recycled into continuous processes.

*Example I*

An aqueous solution of chlorozinc acid is prepared in situ by pasing a stream of gaseous hydrogen chloride through 100 ccs. of a commercial aqueous solution of zinc chloride containing 1 mole (in grams) of $ZnCl_2$ for about every 3.5 moles of water, until about 1 mole of HCl has been dissolved. The solution which then contains chlorozinc acid approximately corresponding to the formula $HZnCl_3$ is maintained at a temperature of 50° C., and a mixture, prepared from 4 moles of benzene and 1 mole of benzyl chloride is added thereto under strong stirring to ensure a satisfactory homogenization of the two liquid phases which are immiscible with each other.

This agitation of the reaction mixture, for instance at a speed of 3,000 revolutions per minute, is continued for about 3 hours at the aforesaid temperature.

The mixture is then decanted, the catalytic aqueous solution is recovered and used with another batch of the reactants. The separated hydrocarbon layer is washed with aqueous sodium hydroxide solution having a concentration of 5% by weight of NaOH, or with an aqueous soda solution containing about 5% of $Na_2CO_3$, and then with pure water. It is then fractionated by distillation, initially under atmospheric pressure, and the higher boiling fractions under reduced pressure of, for instance, 2 Torrs (millimeters of mercury).

About 111 grams of diphenylmethane are obtained which corresponds to a molar yield rate of about 66% based on the initial amount of benzyl chloride.

*Example II*

One mole (about 209 grams) of solid, crystalline chlorozinc acid, having the formula $$H[ZnCl_3].2H_2O \text{ or } ZnCl_2.HCl.2H_2O$$

is dissolved in about 1.5 mole (27 grams) of water, and this aqueous catalytically active solution is used in the same reaction as described in Example I. All other conditions remaining unchanged, there is obtained the same yield rate of diphenylmethane as in the preceding example.

*Example III*

One half mole (about 172.6 grams) of another chlorozinc acid, having the formula $$H[Zn_2Cl_5].2H_2O \text{ or } 2ZnCl_2.HCl.2H_2O$$

is dissolved in 63.3 grams of an aqueous hydrochloric acid solution containing about 0.5 mole of HCl in 2.5 moles of water, thus obtaining substantially the same catalytic solution as in Example II. When repeating Example I with this solution, approximately the same yield rate of diphenylmethane is obtained.

*Example IV*

A commercial aqueous solution of zinc chloride is concentrated until it contains about 136 grams (1 mole) of $ZnCl_2$ in every 27 ccs. of water (1.5 mole). 100 ccs. of this solution are saturated with hydrochloric acid by passing a stream of hydrogen chloride gas therethrough at 75° C.

2 moles of benzene are mixed with one mole of chlorocyclohexane, $C_6H_{11}Cl$, and the mixture is combined with the above catalytic solution of 100 ccs., and the resulting mixture is agitated strongly by stirring at 3,500 r.p.m. for about 6 hours at 75° C.

It is then further treated as described in Example I by decantation, washings, and distillation, and from the separated organic phase there are obtained about 80 grams of pure cyclohexylbenzene having a boiling temperature of 78–79° C. under reduced pressure of 5 Torrs. This corresponds to a yield rate of 50% based on the initially introduced amount of chlorocyclohexane.

*Example V*

2 moles of benzene are alkylated with one mole of cyclohexanol as the alkylating agent instead of chlorocyclohexane, under otherwise identical conditions as described in Example IV and with the same catalyst. The yield rate of cyclohexylbenzene is about 70% based on the initial amount of alkylating agent.

*Example VI*

2 moles of benzene are alkylated with one mole of cyclohexene as the alkylating catalyst, under otherwise identical conditions as described in Example IV. The yield rate is 43% of cyclohexylbenzene based on the initial amount of alkylating agent.

*Example VII*

A catalytic aqueous solution of chloroferric acid is prepared from the constituents, containing one mole of ferric chloride and the one mole of hydrochloric acid per 3 moles of water.

152 ccs. of this aqueous solution are added to a mixture of 2 moles of benzene and 1 mole of chlorocyclohexane, the two liquid phases are intimately and continuously homogenized by stirring at a speed of 3,000 r.p.m. for four hours at room temperature.

After decanting the reacted organic phase, washing the same with a concentrated hydrochloric acid solution and then with water, the organic phase is then subjected to fractionated distillation in the same manner as indicated in Example I, and cyclohexylbenzene is obtained with a yield rate of 33.5% based on the initially introduced chlorocyclohexane.

*Example VIII*

A solution of chloroferric acid is produced in the same manner as in Example VII, and to 152 ccs. of the same there are added 2 moles of benzene and 1 mole of isopropyl chloride and the two liquid phases are agitated for 4 hours at 25° C.

After the same further steps of treatment as described in Example VII, cumene is obtained with a yield rate of 66%, based on the isopropyl chloride initially introduced into the reaction.

Example IX

A catalytic solution of chloroferric acid containing 2 moles of $FeCl_3$ and 2 moles of HCl dissolved in every 4 moles of water is prepared from these constituents, and 72 ccs. of this solution are then mixed with 1 mole of benzene in a reactor. The mixture is vigorously stirred at room temperature, while propene is introduced into the same until the reaction medium is saturated therewith. Stirring is then still continued for four hours at room temperature.

After the reaction mixture has been treated as described in Example VII, cumene is separated with a yield rate of 63% on the basis of the initially introduced benzene, determination of the yield being possible more accurately on the basis of the latter than on that of the alkylating agent introduced.

Example X 229 grams (one mole) of the crystalline dihydrate of chloroferric acid having the formula $HFeCl_4.2H_2O$ are melted by heating to about 46°–47° C. and the resulting solution of the acid in its own water of crystallization is then added to a mixture of 2 moles of benzene and 1 mole of ethyl chloride.

After stirring for 4 hours at about 50° C., there is obtained ethylbenzene with a yield rate of 22% based on the initially introduced alkylating agent.

Example XI

Benzene is alkylated with ethylene in the same manner and in the same molar amounts as in Example IX. Ethylbenzene is obtained with a yield rate of 4% based on the starting amount of benzene.

Example XII

A catalytic aqueous solution is prepared which contains 1 mole of zinc bromide per 5.7 moles of water. Hydrobromic acid is then added until the solution is saturated therewith. 200 ccs. of this solution are added to 1 mole of benzene and 0.5 mole of benzyl chloride, and the reaction mixture is stirred for 3 hours at 50° C. After a further treatment as described in Example I, diphenylmethane is obtained with a yield rate of 35% of the initial alkylating agent.

Example XIII

An aqueous catalytic solution is prepared from 1 mole of zinc chloride per every 2 moles of water, and the solution saturated with hydrogen chloride. 100 ccs. are used with the same amounts of benzene and benzylchloride as in Example XII, and treated for about 30 minutes at 50° C. After an identical separation treatment as in Example I, diphenylmethane is obtained at a yield rate of 70%.

Example XIV

An aqueous catalytic solution is prepared containing one mole of zinc bromide per three moles of water, saturated with hydrochloric acid, and 100 ccs. thereof are used in the same alkylation reaction as described in Example XII, under heating to 50° C. for 1 hour. Diphenylmethane is obtained at a yield rate of 65%.

Example XV

An aqueous catalytic solution is prepared containing 1 mole of zinc chloride for every 2.3 moles of water, saturated with hydrobromic acid and 100 ccs. thereof are used in the same alkylation reaction as described in Example XII, under heating to 50° C. for 1 hour. Diphenylmethane is obtained at a yield rate of 65%.

Example XVI

An aqueous catalytic solution is prepared containing 1 mole of bismuth trichloride for every 2 moles of water and saturated with hydrochloric acid. 100 ccs. thereof are used in the same alkylation reaction as described in Example XII, under heating to 50° C. for about 90 minutes, and subsequent treatment of the reaction mixture as described in Example VII. Diphenylmethane is obtained with a yield rate of 46.5% and dibenzylbenzene with a yield rate of 25%.

Example XVII

A saturated aqueous catalytic solution is prepared containing 1 mole of ferric chloride and hydrogen bromide, and 100 ccs. thereof are used in the same alkylation reaction as described in Example XII, under heating to 50° C. for about 2 hours, and subsequent treatment of the reaction mixture as described in Example VII. Diphenylmethane is obtained with a yield rate of 29% and dibenzylbenzene with a yield rate of 39%.

Example XVIII

An aqueous catalytic solution is prepared containing 1 mole of antimony pentachloride for every 5 moles of water and saturated with hydrochloric acid. 200 ccs. thereof are used in the same alkylation reaction as described in Example XII, under heating to 50° C. for about 30 minutes, and subsequent treatment of the reaction mixture as described in Example VII. Diphenylmethane is obtained with a yield rate of 23% and dibenzylbenzene with a yield rate of 38%.

Example XIX

A commercial aqueous solution containing 1 mole of tin tetrachloride for every 5 moles of water is saturated with hydrogen chloride. 100 ccs. of this catalytic solution are used for the same alkylation reaction as in Example XVIII, under heating to 50° C. for 45 minutes. Diphenylmethane is obtained with a yield rate of 60% and dibenzylbenzene with a yield of 23%.

Example XX

A catalytic solution is prepared from an aqueous solution containing 1 mole of antimony trichloride per 2 moles of water by saturation with halogen hydride. 100 ccs. are utilized in the alkylation reaction described in Example XVIII, under heating to 75° C. for 2 hours. Diphenylmethane is obtained with a yield rate of 25% and dibenzylbenzene with a yield rate of 23%.

Example XXI

An increase in the concentration of the chloroantimonous acid in the catalytic solution leads to different yields of the final products.

Example XX is repeated with an aqueous catalytic solution prepared in the same manner, but from a starting solution containing 1 mole of $SbCl_3$ for every mole of water instead of for every 2 moles thereof.

When repeating Example XX with this catalyst solution under heating to 40° C. for three hours, the resulting alkylated products are diphenylmethane with a yield rate of 21%, dibenzylbenzene with a yield rate of 36%, and higher homologues of these components with a yield rate of 11%.

Example XXII

One mole of toluene is alkylated with 0.5 mole of benzyl chloride under addition of 100 ccs. of a catalytic solution prepared by saturating a solution containing 1 mole of zinc bromide for every 5.7 moles of water with hydrogen bromide. The reaction mixture is maintained at a temperature of 95° C. during a period of 30 minutes. After further treatment as described in Example I, there are obtained benzyltoluene with a yield of 57% and dibenzyltoluene with a yield of 14%.

Example XXIII

Example XXII is repeated with 100 ccs. of a catalyst solution prepared by saturating a commercial zinc chloride solution containing 1 mole of $ZnCl_2$ for every 3.5 moles of water with hydrochloric acid and heating to 50° C. for 1 hour. Benzyltoluene is obtained with a yield rate of 68%.

Example XXIV

Example XXII is repeated with 225 ccs. of a catalyst solution prepared by saturating at about 95° C. a melt of tin dichloride, $SnCl_2 \cdot 2H_2O$, in its own water of crystallization, with hydrogen chloride, under heating of the reaction mixture to 95° C. for 7 hours. The resulting reaction mixture is then further treated as described in Example VII. Benzyltoluene is obtained with a yield rate of 29% and dibenzyltoluene with a yield rate of 7%.

Example XXV

Example XXIV is repeated with 200 ccs. of a catalytically active solution obtained from a melt of commercial ferric chloride, $FeCl_3 \cdot 6H_2O$ in its own water of crystallization, at 95° C., by saturation with hydrogen chloride. The reaction mixture is heated to 95° C. for 90 minutes, and then further treated as described in Example VII. Benzyltoluene is obtained with a yield of 61% and dibenzyltoluene with a yield of 21%.

Example XXVI

Example XXIV is repeated with 100 ccs. of a catalytically active solution obtained from an aqueous solution saturated with ferric bromide and hydrogen bromide. After heating to 50° C. for 2 hours and further treatment of the reaction mixture according to Example VII, benzyltoluene is obtained with a yield rate of 29% and dibenzyltoluene with a yield rate of 39%.

Example XXVII

One mole of toluene is mixed with 0.5 mole of benzyl chloride under addition of 200 ccs. of a catalytically active solution prepared by saturating an aqueous solution containing one mole of ferric bromide for every 6.5 moles of water with hydrogen bromide. The mixture of toluene with the alkylating agent and with the aqueous catalytic solution is heated, under strong stirring, to achieve satisfactory homogenization as in all preceding and subsequent examples, for four hours and 30 minutes to a temperature of about 95° C. The reaction mixture is then further treated as described in Example VII. Benzyltoluene is obtained with a yield rate of 33.7% and dibenzyltoluene with a yield rate of 38%.

Example XXVIII

One mole of toluene is mixed with 0.5 mole of chlorocyclohexane under addition of 100 ccs. of a catalytic solution obtained from an aqueous solution containing 1 mole of zinc chloride for every 1.25 moles of water, by saturation with hydrogen chloride. The reaction mixture is maintained at 95° C. for 90 minutes. After further treatment as described in Example I, cyclohexyltoluene is obtained with a yield of 44%.

Example XXIX

Example XXVIII is repeated, however, with 100 ccs. of a catalytic solution prepared by saturating an aqueous solution containing 1 mole of bismuth trichloride for every 2 moles of water with hydrogen chloride, and heating the reaction mixture to 95° C. for 2 hours 45 minutes. Cyclohexyltoluene is obtained with a yield of 53% and dicyclohexyltoluene with a yield of 9.5%.

Example XXX

Example XXVIII is repeated, however, with 100 ccs. of an aqueous catalytically active solution prepared by saturating an aqueous solution containing 1 mole of tin tetrachloride for every 4 moles of water with hydrochloric acid, and under otherwise identical conditions, treating the mixture of reaction products further as described in Example VII. Cyclohexyltoluene is obtained with a yield rate of 67% and dicyclohexyltoluene with a yield rate of 8%.

Example XXXI

For the sake of comparison, Example XXX is repeated, but with 100 ccs. of a pure tin tetrachloride melt (M.P.=37° C.) free from water. No condensation of chlorocyclohexane with toluene is observed.

Example XXXII

For the sake of comparison, Example XXX is repeated, but with 100 ccs. of pure tin tetrachloride melt saturated with hydrogen chloride gas, but free from water. No alkylation of toluene with chlorocyclohexane is observed.

Example XXXIII

One mole of phenol is mixed with 0.5 mole of benzyl chloride under addition of 100 ccs. of a catalytically active solution prepared from an aqueous solution containing 1 mole of tin dichloride for every 2 moles of water by saturation with hydrogen chloride. The reaction mixture is maintained at 50° C. for 75 minutes. After further treatment analogous to that described in Example VII, benzylphenol, soluble in 5% aqueous sodium hydroxide, is obtained with a yield rate of 34%, and dibenzylphenol with a yield rate of 14%.

Example XXXIV

Example XXXIII is repated, however, the aqueous catalyst is prepared from a starting solution containing 1 mole of tin dichloride for every 3 instead of 2 moles of water. With this catalyst containing a higher ratio of water, benzylphenol is obtained at a yield rate of 44.5%, and dibenzylphenol at a yield rate of 22%.

Example XXXV

Example XXXIII is repated, however, with 100 ccs. of a solution obtained from an aqueous solution containing 1 mole of antimony trichloride for every 4 moles of water by saturation with hydrogen chloride, under heating of the alkylation mixture to 50° C. for 35 minutes. Benzylphenol is obtained with a yield rate of 50% and dibenzylphenol with a yield rate of 20%.

Example XXXVI

Example XXXIII is repeated, however, with 100 ccs. of a catalytic solution prepared with an aqueous solution of 1 mole of titanium tetrachloride for every 6 moles of water by saturation with hydrogen chloride, under heating of the alkylation mixture to 50° C. for 2 hours. Benzylphenol is obtained at a yield rate of 46% and dibenzylphenol at a yield rate of 22%.

Example XXXVII

No benzylation of phenol is obtained under the same conditions when omitting the catalytic solution altogether, or when using only a water saturated in HCl, under otherwise identical conditions.

Example XXXVIII

Example XXXIII is repeated, however, by utilizing 100 ccs. of a catalyst prepared by saturation of a commercial solution of iron trichloride, containing 1 mole of $FeCl_3$ for every 12 moles of water with hydrochloric acid, under heating of the alkylation mixture to 50° C. for 2 hours. Benzylphenol is obtained at a yield rate of 36% and dibenzylphenol at a yield rate of 39%.

Example XXXIX

Two moles of toluene are mixed with 1 mole of tert-butylchloride, $(CH_3)_3C.Cl$, under addition of 150 ccs. of a catalytic solution prepared by saturating an aqueous solution containing 1 mole of zinc chloride for every 2 moles of water with hydrochloric acid. The alkylation mixture is heated to 50° C. for 30 minutes. Further treatment according to Example VII permits to isolate tert-butyltoluene with a yield rate of 72%.

Example XL

Example XXXIX is repeated, however, with 220 ccs. of a catalytic solution prepared by saturating an aqueous solution containing 1 mole of ferric chloride for every 4 moles of water, with hydrogen chloride, under heating of the alkylation mixture to 50° C. for 10 minutes. Tert-butyltoluene is obtained with a yield of 42%.

Example XLI

One mole of benzene is mixed with 0.5 mole of benzyl acetate under addition of 100 ccs. of a catalytic solution prepared by saturating an aqueous solution of 1 mole of zinc chloride for every 2 moles of water with hydrogen chloride. The alkylation mixture is heated to 50° C. for 2 hours. After further treatment according to Example I, diphenylmethane is isolated with a yield rate of 33%, dibenzylbenzene with a yield rate of 12%, and higher benzylated benzenes with a yield rate of 18%.

Example XLII

Example XLI is repeated, using 0.5 mole of benzyl alcohol instead of benzyl acetate as the alkylating agent. Diphenylmethane is obtained at a yield rate of 20%, dibenzylbenzene at 18% and the higher homologues at 26%.

Example XLIII

One mole of anisole is mixed with 0.5 mole of benzyl chloride under addition of 100 ccs. of a catalytic solution prepared by saturating an aqueous solution containing one mole of zinc chloride for every 5 moles of water with hydrogen chloride. After heating the alkylation mixture for 2 hours to 50° C., the mixture is further treated as described in Example I and benzylanisole is isolated therefrom with a yield rate of 71% and dibenzylanisole with a yield rate of 10%.

Example XLIV

A mixture of 25 ccs. of $FeCl_3.2H_2O$, 20 ccs. of isobutane and 5 ccs. of isobutene is stirred for 45 minutes, under a starting pressure of 20 kg./cm.$^2$ HCl and at a temperature of 50° C.

The mixture is then cooled and the pressure let fall down to atmospheric pressure. The organic and aqueous phases are separated by decantation. The organic phase is successively washed with water and sodium carbonate, washed again with water, and then dried upon calcium chloride. The resulting mixture, amounting to 42% by weight of the initial amount of isobutene, contains 2,2,4-trimethylpentane, 2,3,4-trimethylpentane, 2,3,3-trimethylpentane and 2,5-dimethylhexane.

Example XLV

The same procedure as in Example XLIV is followed, but ferric chloride is replaced by 25 ccs. of $FeCl_3.3H_2O$, the temperature being 75° C. and the starting pressure of HCl being 40 kg./cm.$^2$. The resulting hydrocarbon mixture amounts to 48% by weight of the initial amount of isobutene.

Example XLVI

The same procedure as in Example XLIV is followed, but ferric chloride is replaced by 25 ccs. of $FeCl_3.2H_2O$ saturated from HCl at a temperature of 50° C., under atmospheric pressure, and the HCl pressure is replaced by a 40 kg./cm.$^2$ nitrogen pressure. The resulting hydrocarbon mixture amounts to 40% by weight of the initial amount of isobutene.

Example XLVII

An aqueous catalytic solution is prepared containing 1 mole of $ZnCl_2$ for every 1.25 moles of water and saturated with hydrochloric acid at 95° C. 100 ccs. thereof are added to 1 mole of benzene and 0.5 mole of tetrapropylene, and the reaction mixture is stirred for 3 hours at 95° C. After a further treatment as described in Example I, dodecylbenzene is obtained with a yield rate of 40% of the initial alkylating agent.

Example XLVIII

Example XLVII is repeated, but 100 ccs. of the catalyst solution are added to 1 mole of naphthalene and 0.5 mole of octadecyl chloride, and the reaction mixture is stirred in an autoclave for 3 hours at 150° C. After a further treatment as described in Example I, octadecylnaphthalene is obtained with a yield rate of 25% of the initial alkylating agent.

Example XLIX

Example XLVII is repeated, but 100 ccs. of the catalyst solution are added to 1 mole of benzene and 0.5 mole of methyl chloride, and the reaction mixture is stirred in an autoclave for 5 hours at 140° C. After a further treatment as described in Example L, toluene is obtained with a yield rate of 20% of the initial alkylating agent.

The halogenometallic acids in aqueous solution the most suitable as catalysts according to my invention may contain as central metal atoms of the acid anion zinc, titanium, tin, arsenic (metallic modification), antimony, bismuth and iron.

It is understood that this invention is susceptible to modifications in order to adapt it to different usages and conditions and, accordingly, it is desired to comprehend such modifications within this invention as may fall within the scope of the appended claims.

Alkylation products obtained by carrying out the process according to my invention are more particularly useful for manufacturing intermediary products from benzene derivatives such as cumene which may be used as a raw material for manufacturing phenol and acetone and alkylation products from aliphatic hydrocarbonts such as isooctane, which is an essential component of gasoline of high-octane number. Alkylation products of aromatic compounds are also of great utility as starting material for manufacturing detergents (mainly by way of subsequent sulfonation) and plastics such as polyglycol terephthalate which is a raw material for manufacturing synthetic fibers.

One of the most valuable alkylation products obtained according to the present invention is cumene which is obtained preferably by alkylating benzene with propene in the presence of chloroferric acid of the formula $HFeCl_4.2H_2O$.

This reaction is of the preferred type of reactions carried out according to the invention i.e. the alkylation with an olefine of a benzene compound in the presence of a chloroferric acid or a solution of chloride acid in water acidified by HCl or HBr.

What I claim is:

1. A process for alkylating a compound selected from the group consisting of aromatic hydrocarbons and aliphatic hydrocarbons having at least one tertiary carbon atom linked to one hydrogen atom, comprising the steps of:
    (a) mixing said compound at a temperature up to 150° C., in intimate contact with an alkylating agent selected from the group consisting of aliphatic, cycloaliphatic and araliphatic olefines, alcohols, chlorides and bromides, having from 2 to 18 carbon atoms per molecule and alkyl, cycloalkyl and aralkyl acetates having from 4 to 20 carbon atoms per molecule, and with an aqueous solution of a hydrogen halide and a metal halogenide, said metal being selected from the group consisting of zinc, iron, bismuth, antimony, tin and titanium, said solution having a metal halogenide content ranging from one mole of the same per 6 moles of water up to the amount corresponding to the saturation of water with said metal halogenide, and a hydrogen halide content corresponding to the substantial saturation of water with said hydrogen halide,
    (b) separating the organic and aqueous phases from each other, and (c) fractionating the organic phase so as to isolate the alkylated hydrocarbon therefrom.

2. A process for alkylating aliphatic hydrocarbons having at least one tertiary carbon atom linked to one hydrogen atom, comprising the steps of:
(a) mixing said hydrocarbon, at a temperature up to 150° C., in intimate contact with an alkylating agent selected from the group consisting of aliphatic, cycloaliphatic and araliphatic olefines, alcohols, chlorides and bromides having from 2 to 18 carbon atoms per molecule and alkyl, cycloalkyl and aralkyl acetates having from 4 to 20 carbon atoms per molecule, and with an aqueous solution of a hydrogen halide and a metal halogenide, the metal being selected from the group consisting of zinc, iron, bismuth, antimony, tin and titanium, said solution having a metal halogenide content ranging from one mole of the same per 20 moles of water up to the amount corresponding to the saturation of water with said metal halogenide,
(b) separating the organic and aqueous phases from each other, and
(c) fractionating the organic phase so as to isolate the alkylated hydrocarbon therefrom.

3. A process for alkylating a compound selected from the group consisting of aromatic hydrocarbons and aliphatic hydrocarbons having at least one tertiary carbon atom linked to one hydrogen atom, comprising the steps of:
(a) mixing said compound, at a temperature up to 150° C., in intimate contact with an alkylating agent selected from the group consisting of aliphatic, cycloaliphatic and araliphatic olefines, alcohols, chlorides and bromides, having from 2 to 18 carbon atoms per molecule and alkyl, cycloalkyl and aralkyl acetates having from 4 to 20 carbon atoms per molecule, and with an aqueous solution of a hydrogen halide and a metal halogenide, said metal being selected from the group consisting of zinc, iron, bismuth, antimony, tin and titanium, said solution having a metal halogenide content ranging from one mole of the same per 20 moles of water up to the amount corresponding to the saturation of water with said metal halogenide,
(b) separating the organic and aqueous phases from each other, and
(c) fractionating the organic phase so as to isolate the alkylated hydrocarbon therefrom.

4. A process for alkylating benzene to cumene consisting of:
(a) contacting the former with propene, at a temperature up to 150° C., in the presence of an aqueous solution of chloroferric acid of the formula

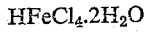

$$HFeCl_4 \cdot 2H_2O$$

said solution having a chloroferric acid concentration ranging from one mole of $HFeCl_4$ per 20 moles of water up to the maximum amount of said chloroferric acid which may be dissolved in water,
(b) separating the organic and aqueous phases from each other, and
(c) fractionating the organic phase so as to isolate cumene therefrom.

5. The process of contacting benzene with an aqueous solution saturated with a hydrogen halide selected from the group consisting of hydrogen chloride and hydrogen bromide, of zinc chloride, which solution contains a ratio of $ZnCl_2:H_2O$ ranging from 1:20 to the $ZnCl_2$ saturation limit in said hydrogen halide saturated solution, in the presence of an alkyl chloride having from 2 to 18 carbon atoms per molecule, and stirring the resulting mixture at a temperature of between 50-75° C., so as to form at least one alkylated benzene in the mixture, and isolating the alkylated benzene therefrom.

6. The process of contacting benzene with an aqueous solution saturated with a hydrogen halide selected from the group consisting of hydrogen chloride and hydrogen bromide, of iron trichloride, which solution contains a ratio of $FeCl_3:H_2O$ ranging from 1:20 to the $FeCl_3$ saturation limit in said hydrogen halide saturated solution, in the presence of an alkyl chloride having from 2 to 18 carbon atoms per molecule, and stirring the resulting mixture at a temperature of between 50-75° C., so as to form at least one alkylated benzene in the mixture, and isolating the alkylated benzene therefrom.

7. The process of contacting benzene with an aqueous solution saturated with a hydrogen halide selected from the group consisting of hydrogen chloride and hydrogen bromide, of antimony chloride, which solution contains a ratio of antimony chloride:water ranging from 1:20 to the antimony chloride saturation limit in said hydrogen halide saturated solution, in the presence of an alkyl chloride having from 2 to 18 carbon atoms per molecule, and stirring the resulting mixture at a temperature of between 50-75° C., so as to form at least one alkylated benzene in the mixture, and isolating the alkylated benzene therefrom.

8. The process of contacting benzene with an aqueous solution saturated with a hydrogen halide selected from the group consisting of hydrogen chloride and hydrogen bromide, of iron tribromide, which solution contains a ratio of $FeBr_3:H_2O$ ranging from 1:20 to the $FeBr_3$ saturation limit in said hydrogen halide saturated solution, in the presence of an alkyl chloride having from 2 to 18 carbon atoms per molecule, and stirring the resulting mixture at a temperature of between 50-75° C., so as to form at least one alkylated benzene in the mixture, and isolating the alkylated benzene therefrom.

9. The process of contacting benzene with an aqueous solution saturated with a hydrogen halide selected from the group consisting of hydrogen chloride and hydrogen bromide, of titanium tetrachloride, which solution contains a ratio of $TiCl_4:H_2O$ ranging from 1:20 to the $TiCl_4$ saturation limit in said hydrogen halide saturated solution, in the presence of an alkyl chloride having from 2 to 18 carbon atoms per molecule, and stirring the resulting mixture at a temperature of between 50-75° C., so as to form at least one alkylated benzene in the mixture, and isolating the alkylated benzene therefrom.

10. The process of contacting toluene with an aqueous solution saturated with a hydrogen halide selected from the group consisting of hydrogen chloride and hydrogen bromide, of zinc chloride, which solution contains a ratio of $ZnCl_2:H_2O$ ranging from 1:20 to the $ZnCl_2$ saturation limit in said hydrogen salide saturated solution, in the presence of an alkyl chloride having from 2 to 18 carbon atoms per molecule, and stirring the resulting mixture at a temperature of between 50-75° C., so as to form at least one alkylated toluene in the mixture, and isolating the alkylated toluene therefrom.

11. The process of contacting toluene with an aqueous solution saturated with a hydrogen halide selected from the group consisting of hydrogen chloride and hydrogen bromide, of iron trichloride, which solution contains a ratio of $FeCl_3:H_2O$ ranging from 1:20 to the $FeCl_3$ saturation limit in said hydrogen halide saturated solution, in the presence of an alkyl chloride having from 2 to 18 carbon atoms per molecule, and stirring the resulting mixture at a temperature of between 50-75° C., so as to form at least one alkylated toluene in the mixture, and isolating the alkylated toluene therefrom.

12. The process of contacting toluene with an aqueous solution saturated with a hydrogen halide selected from the group consisting of hydrogen chloride and hydrogen bromide, of antimony chloride, which solution contains a ratio of antimony chloride:water ranging from 1:20 to the antimony chloride saturation limit in said hydrogen halide saturated solution, in the presence of an alkyl chloride having from 2 to 18 carbon atoms per molecule, and stirring the resulting mixture at a temperature of between 50-75° C., so as to form at least one alkylated toluene in the mixture, and isolating the alkylated toluene therefrom.

13. The process of contacting toluene with an aqueous solution saturated with a hydrogen halide selected from the group consisting of hydrogen chloride and hydrogen bromide, of iron tribromide, which solution contains a ratio of $FeBr_3:H_2O$ ranging from 1:20 to the $FeBr_3$ saturation limit in said hydrogen halide saturated solution, in the presence of an alkyl chloride having from 2 to 18 carbon atoms per molecule, and stirring the resulting mixture at a temperature of between 50–75° C., so as to form at least one alkylated toluene in the mixture, and isolating the alkylated toluene therefrom.

14. The process of contacting toluene with an aqueous solution saturated with a hydrogen halide selected from the group consisting of hydrogen chloride and hydrogen bromide, of titanium tetrachloride, which solution contains a ratio of $TiCl_4:H_2O$ ranging from 1:20 to the $TiCl_4$ saturation limit in said hydrogen halide saturated solution, in the presence of an alkyl chloride having from 2 to 18 carbon atoms per molecule, and stirring the resulting mixture at a temperature of between 50–75° C., so as to form at least one alkylated toluene in the mixture, and isolating the alkylated toluene therefrom.

References Cited in the file of this patent
UNITED STATES PATENTS

| | | |
|---|---|---|
| 1,972,956 | Seymour | Sept. 11, 1934 |
| 2,031,719 | Langwell et al. | Feb. 25, 1936 |
| 2,091,483 | Olin | Aug. 31, 1937 |
| 2,793,239 | Toland | May 21, 1957 |

OTHER REFERENCES

Grosse et al.: Jour. Organic Chem., vol. 1 (1937), (4 pages) 559–62.